March 22, 1938.    H. E. HOLLMANN    2,111,778
FADING ELIMINATION
Filed Aug. 23, 1934
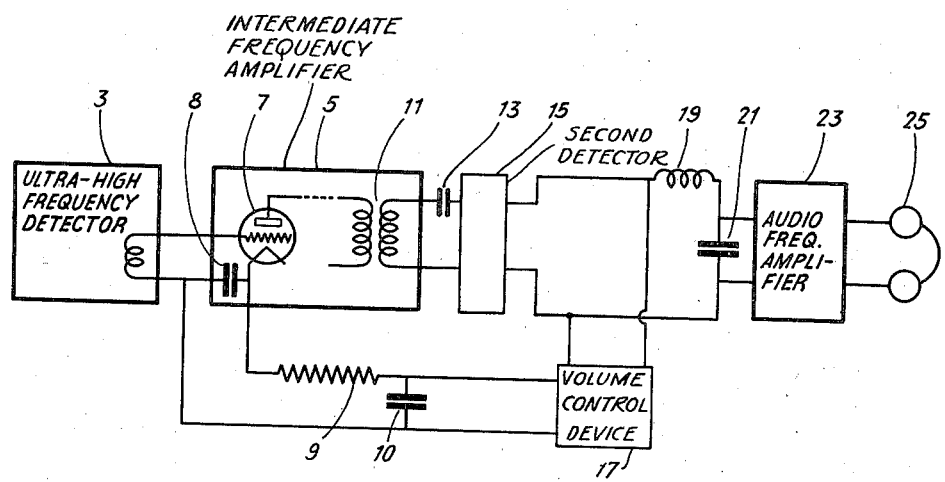
INVENTOR
HANS ERIC HOLLMANN
BY
ATTORNEY Patented Mar. 22, 1938

2,111,778

UNITED STATES PATENT OFFICE 2,111,778

FADING ELIMINATION

Hans Erich Hollmann, Berlin, Germany, assignor to Telefunken Gesellschaft für Drahtlose Telegraphie m. b. H., Berlin, Germany, a corporation of Germany Application August 23, 1934, Serial No. 741,095
In Germany August 25, 1933

1 Claim. (Cl. 250—20)

My present invention relates to a method of eliminating fading in intelligence transmission on ultra-short waves. For the sending of ultra-short waves amounting to a few meters down to several centimeters, only direct radiation may be used according to the present state of the art; in fact, it has been for this reason that the practically attainable range is in the main governed by optical visibility (sight) between transmitter and receiver. Beyond this limit, the field intensity diminishes at a very rapid rate and it is then, to a certain extent, a function of the conditions prevailing in the lower atmosphere, say, cloud formation. Consequently, in ultra-short wave systems fadings may arise also over greater distances, and these are similar to the fading phenomena caused by reflections in the upper atmosphere.

However, even in the presence of small distances, the field intensity of an ultra-short wave transmitter under certain circumstances is subject to serious fluctuations due to obstacles and obstructions interposed in the path of the radiations, either by virtue of the fact that the transmitter and/or the receiver stations themselves are mobile, or that an obstruction, such as a ship, happens to travel through between stationary stations.

In all of such cases the field intensity falls very markedly at the receiving end and impairs uniform reception. In order that such disturbing decreases in the signal strength may be compensated, the idea would, of course, be self-suggesting to cause automatic levelling of the carrier-wave amplitude similar to the fading compensation on longer waves. However, it is known from practical experience that radio-frequency amplification in the input stage is extremely difficult where ultra-short waves of 1 meter length and less are concerned; indeed, at the present state of the art this scheme is entirely impracticable where decimeter waves are dealt with. Ultra-short wave receivers now known comprise only a receiver tube acting as an audion or as an amplifying detector, and they insure the sensitiveness required in any given instance only by the subsequent amplification of the modulation frequencies. Automatic adjustment of a radio-frequency amplifier in such a way that the carrier amplitude fed into the rectifier is stabilized by automatic regulation of the gain is thus impossible in the case of ultra-short waves.

Now, in this case the difficulties may be overcome, according to the invention, and fading effects may be compensated by suitably controlling an intermediate frequency. For this purpose, the ultra-short wave is doubly modulated. Upon the ultra-high carrier frequency $m_1$, there is impressed an auxiliary carrier frequency $m_2$ which is again modulated by an audio frequency wave $m_3$.

At the receiving end, the ultra-short wave receiver filters out wave $m_1$ and feeds the carrier wave $m_2$ to an intermediate frequency amplifier. At this point another rectifier separates the modulation $m_3$ and feeds the same, optionally after repeated audio-frequency amplification, to a responsive device.

My invention will be more completely understood from the following detailed description when read in connection with the accompanying drawing, the sole figure of which represents more or less conventionally and diagrammatically the essential features of a typical embodiment.

Referring to the drawing I show an ultra-high frequency detector 3. The output energy from the detector is fed to an intermediae frequency amplifier 5 which may comprise any desired number of stages of amplifications using electron discharge tubes of any suitable type. Only one such tube 7 is shown for purposes of illustration.

The output energy from the amplifier 5 may be impressed across a transformer 11 and thence fed through a capacitor 13 to a detector 15 where the intermediate frequency components are rectified. The alternating frequency components of the signal frequency may then be impressed across a suitable inductive impedance 19 to an audio frequency amplifier 23. The output circuit of this amplifier may include any responsive device 25. The presence of the detector 17 in the circuit which interconnects the intermediate frequency amplifier and the audio frequency amplifier enables one to provide a volume control device utilizing the direct current component of the detected energy. The variable impedance of the detector itself provides differences of potential across a resistor 9 whereas the intermediate frequency components may be dissipated across the capacitor 10. It is thus seen that the system as shown provides the means for varying the bias potential on the tubes such as the tube 7 thereby to control the gain in the intermediate frequency amplifier. This control is proportional to the mean or average incoming amplitude as fed to the intermediate frequency amplifier tubes.

The novel method here disclosed proves particularly useful whenever signals from several transmitting stations are to be received simultaneously. Such transmitting stations may be operated on the same carrier wave $m_1$, but with different intermediate frequencies $m_2$. In that case, perfectly constant transmission measures are insured for all transmission channels regardless of the local field distribution prevailing at any given instant for the various transmitters, and independently of the momentary overloading of the receiver.

What I claim is:—

In a receiving system for doubly-modulated ultra-high frequency signalling waves of 1 meter or less and consisting solely of an ultra-high frequency detector, intermediate frequency amplifier and second detector arranged in cascade, the method of obtaining usefully demodulated signalling energy which comprises rectifying the ultra-high frequency component of the signalling waves, thereby to obtain unamplified singly-modulated intermediate frequency signalling enery uncontrolled as to volume, amplifying and rectifying said intermediate frequency signalling energy, diverting a portion of the energy so rectified and applying it solely to said amplifier as a control medium for adjusting the gain in the amplifying process so as to obtain a quasi-constant output level, and delivering another portion of the energy so rectified for utilization of the signals therein.

HANS ERICH HOLLMANN.